Figure 1:
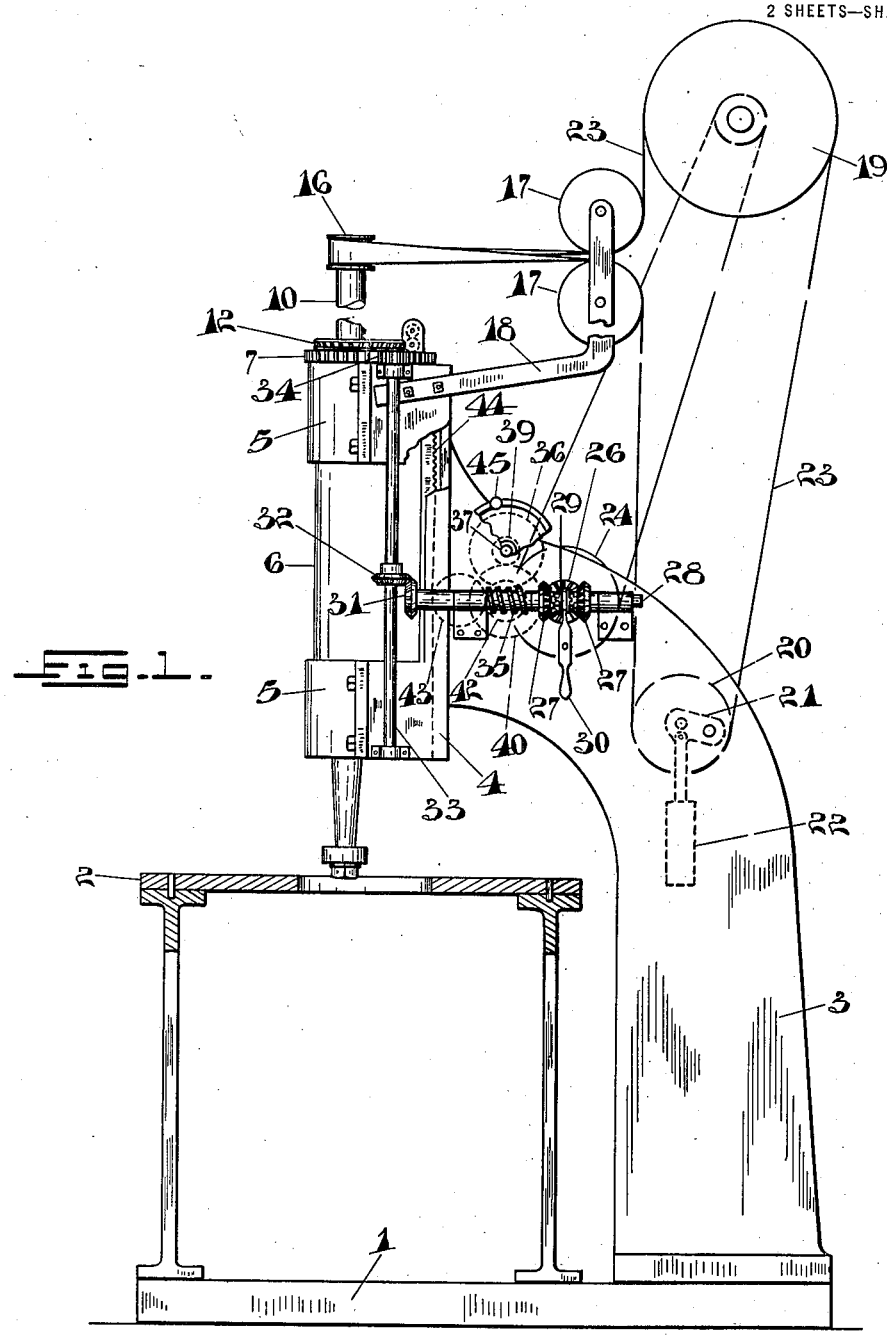

G. R. WARD.
CYLINDER GRINDING MACHINE.
APPLICATION FILED APR. 8, 1921.

1,414,386.

Patented May 2, 1922.
2 SHEETS—SHEET 1.

INVENTOR
G. R. Ward.
BY J. Edward Maybee
ATTY.

G. R. WARD.
CYLINDER GRINDING MACHINE.
APPLICATION FILED APR. 8, 1921.
1,414,386.
Patented May 2, 1922.
2 SHEETS—SHEET 2.
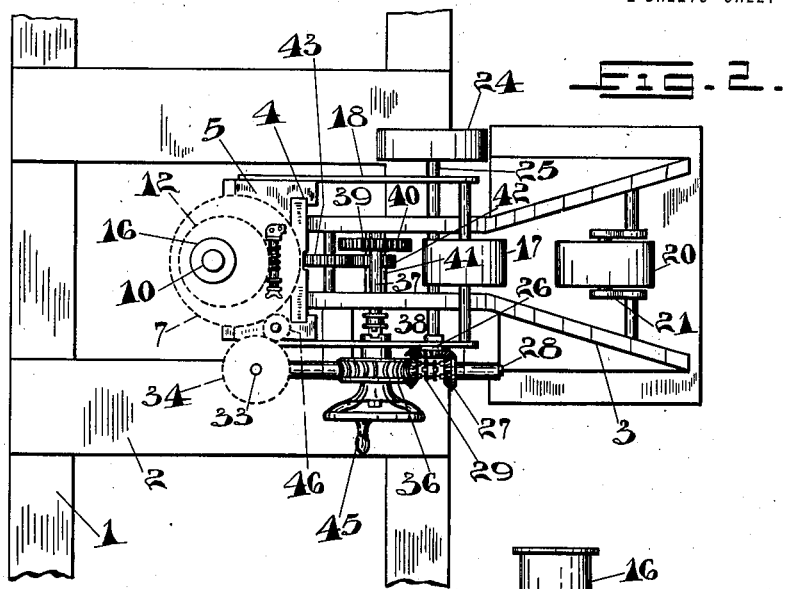
FIG. 2.
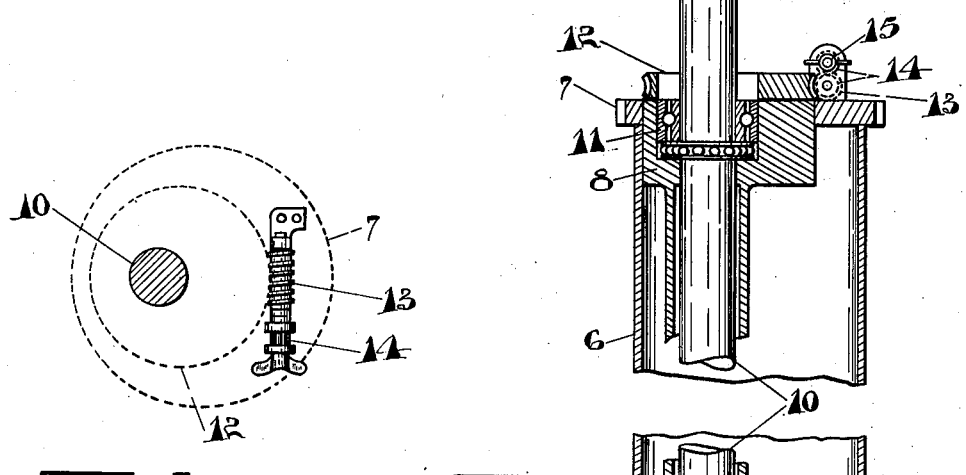
FIG. 3.
FIG. 4.
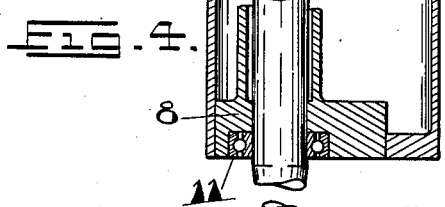
INVENTOR.
G. R. Ward.
BY J. Edward Maybee.
ATTY.

UNITED STATES PATENT OFFICE.

GEORGE R. WARD, OF TORONTO, ONTARIO, CANADA.

CYLINDER-GRINDING MACHINE.

1,414,386.    Specification of Letters Patent.    Patented May 2, 1922.

Application filed April 8, 1921. Serial No. 459,649.

*To all whom it may concern:*

Be it known that I, GEORGE R. WARD, of the city of Toronto, in the county of York, Province of Ontario, Canada, a subject of the King of Great Britain, have invented certain new and useful Improvements in Cylinder-Grinding Machines, of which the following is a specification.

This invention relates to grinding apparatus of a type in which a tool-carrying spindle is rotatably and eccentrically mounted in a bearing sleeve which is itself rotatably adjustable in an outer sleeve rotatable in a head vertically adjustable on a suitable bracket, and my object is to provide simple and effective means for reciprocating the head, for rotating the outer sleeve, and for driving the tool carrying spindle.

I attain my object by means of the constructions hereinafter described and illustrated in the accompanying drawings in which—

Fig. 1 is a side elevation, partly in section and partly broken away of a machine constructed in accordance with my invention;

Fig. 2 a plan view of the same;

Fig. 3 a sectional detail showing the means for rotarily adjusting the bearing sleeve of the tool carrying spindle; and Fig. 4 a vertical section, partly broken away, of the tool carrying parts.

In the drawings like numerals of reference indicate corresponding parts in the different figures.

1 is a base on which is carried the work supporting table 2, and also a bracket 3, which carries a vertical guide 4 over the table 2. On this guide is slidably supported the head 5 in which are formed bearings for the sleeve 6, the upper end of which is provided with a gear 7 by means of which it may be rotated as hereinafter described.

In the sleeve 6 is rotatably supported the bearing sleeve 8. In the bearing sleeve 8 is journalled the tool-carrying spindle 10, preferably by means of ball bearings 11. The tool spindle is located eccentric to the axis of the sleeve 8 so that by rotarily adjusting the bearing sleeve, the tool bearing spindle is adjusted radially of the sleeve 6, so that it may be set to grind on circles of different diameters as may be necessary.

Preferably also the sleeve 8 is eccentrically located relative to the axis of the sleeve 6 so as to increase the range of adjustment of the spindle 10 and to provide space at the top of the sleeve 6 for the adjusting means for the bearing sleeve. For adjustment purposes the bearing sleeve has a worm wheel 12 secured thereto, which meshes with a worm 13 journalled on the upper side of the gear 7 secured to the sleeve 6. This worm is driven by spur gearing 14 from a shaft 15 suitably journalled and adapted to be rotated by hand to operate the worm, and through it the worm wheel. The spindle, when the machine is in operation, is continuously driven through the medium of a pulley 16 secured to its upper end. A pair of pulleys 17 are secured to a frame 18 secured to the head 5.

On the line shaft above the pulleys 17 is carried a pulley 19. On the bracket 3 is supported an idler pulley 20 so that it is vertically movable. Preferably the pulley is journalled on a swinging frame 21 journalled on the bracket, and from this frame is hung a weight 22. The belt 23 passes round the line pulley 19, between and around the pulleys 17 and also round the idler 20, and is kept taut by the weight 22. As the sleeve 6 slowly rotates when the machine is in operation, and as the tool bearing spindle is usually eccentric to the axis of the sleeve 6, the pulley 16 varies its position relative to the pulleys 17 and the alternate tightening and slackening of the belt which would otherwise take place is taken care of by the idler pulley 20. The grinding tool requires to be vertically reciprocated during the operation of grinding the cylinder, and to effect this movement I provide the following mechanism. A pulley 24 is secured to a shaft 25 journalled in the bracket 3. On one end of this shaft is secured a bevel gear 26 meshing with two bevel gears 27 loose on the shaft 28 journalled on the bracket 3. A shifting clutch member 29 operable by the suitably fulcrumed shifted lever 30 serves to place either of the bevel gears 27 in driving engagement with the shaft 28, so that the shaft may be rotated in either direction at will. This shaft carries a bevel gear 31, which meshes with a bevel gear 32, which is relatively slidable on and rotatable with a shaft 33 journalled vertically on the head 5, and carrying at its upper end a pinion 34 which meshes with an idler 46 which meshes with the gear wheel 7 on the sleeve 6. The rotation of the sleeve 6 carrying the grinding tool round a cylinder being ground is thus effected.

The shaft 28 also carries a worm 35 which meshes with a worm wheel 36, which is loose on the shaft 37 journalled in the bracket 3, but which may be given a driving engagement with the shaft by means of the clutch 38. On the shaft 37 is a pinion 39 which meshes with a gear wheel 40 fast on the shaft 41 journalled on the bracket 3 and carrying a gear wheel 42 meshing with a suitably journalled gear wheel 43, which meshes with a rack 44 secured to the back of the head 5. This train of gearing is so proportioned as to give the necessary slow vertical movement of the head 5, the movement being reversed as may be necessary by operating the shifter lever 30.

A quick movement in adjusting the grinding tool is obtained by means of a hand wheel 45 which is secured to the shaft 37 and by means of which the shaft may be operated when the clutch 38 is thrown out.

The mode of operation of the device is substantially as follows. A cylinder is secured in any suitable manner to the work-supporting table in axial alinement with the sleeves 6. The grinding tool is then adjusted to contact with the wall of the cylinder by means of the shaft 15 which actuates the worm wheel 12 through the gearing described, and thus adjusts the eccentric sleeve 8 in which the spindle of the grinding tool is journalled. The machine is now started in motion and the grinding tool is thus given three motions, a rotary movement on its own axis, a movement in an orbit within the cylinder, and a vertical movement. The orbital movement and vertical movement are subject to reversal of direction by the operation of the gearing hereinbefore described, which is controlled by the shifter lever 30. As required during the operation of grinding, the grinding tool is adjusted radially of the cylinder through the operation of the shaft 15.

What I claim as my invention is:—

1. In a cylinder grinding machine, the combination of a supporting bracket; a head vertically slidable thereon; a sleeve rotatably mounted in said head; a bearing sleeve rotatably adjustable in the said sleeve; a spindle journalled eccentrically in said bearing sleeve; a pulley secured to the upper end of said spindle; a frame secured to the head; two pulleys horizontally journalled on said frame; a pulley on a line shaft above the said two pulleys; a weighted idler pulley located below said two pulleys and mounted to move vertically; and a belt passing round the spindle pulley between and around the two pulleys aforesaid and round the line shaft pulley and the idler.

2. In a cylinder grinding machine, the combination of a bracket; a head vertically movable thereon; a vertical sleeve rotatable in said head; a grinding tool spindle rotatably carried by said sleeve; a gear wheel secured to said sleeve; a vertical shaft journalled on the head; a pinion secured to said shaft meshing with the said gear wheel; a bevel gear wheel relatively slidable on and mounted to rotate with said shaft; a horizontal shaft journalled on the bracket; a bevel pinion secured to the horizontal shaft and meshing with the pinion on the vertical shaft; two opposed bevel gears loose on the horizontal shaft; a clutch whereby either bevel gear may be given a driving engagement with the shaft; a driving shaft at right angles to the said shaft; and a bevel gear wheel secured thereto meshing with both the opposed bevel gear wheels.

3. In a cylinder grinding machine, the combination of a bracket; a head vertically movable thereon; a vertical sleeve rotatable in said head; a grinding tool spindle rotatably carried by said sleeve; a gear wheel secured to said sleeve; a vertical shaft journalled on the head; a pinion secured to said shaft meshing with the said gear wheel; a bevel gear wheel relatively slidable on and mounted to rotate with said shaft; a horizontal shaft journalled on the bracket; a bevel pinion secured to the horizontal shaft and meshing with the pinion on the vertical shaft; two opposed bevel gears loose on the horizontal shaft; a clutch whereby either bevel gear may be given a driving engagement with the shaft; a driving shaft at right angles to the said shaft; a bevel gear wheel secured thereto meshing with both the opposed bevel gear wheels; a worm on the shaft carrying the opposed bevel gear wheels; a shaft journalled on the bracket; a worm wheel on said shaft meshing with the said worm; a rack secured to the head; and gearing whereby the rack is actuated from the worm wheel shaft.

4. In a cylinder grinding machine, the combination of a bracket; a head vertically movable thereon; a vertical sleeve rotatable in said head; a grinding tool spindle rotatably carried by said sleeve; a gear wheel secured to said sleeve; a vertical shaft journalled on the head; a pinion secured to said shaft meshing with the said gear wheel; a bevel gear wheel relatively slidable on and mounted to rotate with said shaft; a horizontal shaft journalled on the bracket; a bevel pinion secured to the horizontal shaft and meshing with the pinion on the vertical shaft; two opposed bevel gears loose on the horizontal shaft; a clutch whereby either bevel gear may be given a driving engagement with the shaft; a driving shaft at right angles to the said shaft; and a bevel gear wheel secured thereto meshing with both the opposed bevel gear wheels.

5. In a cylinder grinding machine, the combination of a bracket; a head vertically movable thereon; a vertical sleeve rotatable in said head; a grinding tool spindle rotatably carried by said sleeve; a gear wheel secured to said sleeve; a vertical shaft journalled on the head; a pinion secured to said shaft meshing with the said gear wheel relatively; a bevel gear wheel slidable on and mounted to rotate with said shaft; a horizontal shaft journalled on the bracket; two opposed bevel gears loose on the horizontal shaft; a clutch whereby either bevel gear may be given a driving engagement with the shaft; a driving shaft at right angles to the said shaft; a bevel gear wheel secured thereto meshing with both the opposed bevel gear wheels; a worm on the shaft carrying the opposed bevel gear wheels; a shaft journalled on the bracket; a worm wheel on said shaft meshing with the said worm and loose on said shaft; a hand wheel fixed on the shaft; a clutch whereby the worm wheel may be given a driving engagement with the said shaft; a rack secured to the head; and gearing whereby the rack is actuated from the worm wheel shaft.

Signed at Toronto, Canada, this 22 day of March, 1921.

GEORGE R. WARD.